United States Patent [19]

M'Sadoques et al.

[11] Patent Number: 4,646,200
[45] Date of Patent: Feb. 24, 1987

[54] CIRCUIT BREAKER SUPPORT SADDLE WITH REMOVABLE PHASE BARRIERS

[75] Inventors: Andre J. M'Sadoques, Southington; Joseph F. Rich, New Britain, both of Conn.; George L. Shuttleworth, Amsterdam, N.Y.

[73] Assignee: General Electric Company, New York, N.Y.

[21] Appl. No.: 802,348

[22] Filed: Nov. 27, 1985

[51] Int. Cl.[4] .............................................. H02B 1/04
[52] U.S. Cl. .................................. 361/355; 361/363; 361/376
[58] Field of Search ............... 174/148, 149 R, 149 B, 174/156; 200/293–296; 339/198 N, 22 B; 361/346, 353–356, 358, 359, 361, 363, 376

[56] References Cited

U.S. PATENT DOCUMENTS

| | | | |
|---|---|---|---|
| 3,128,142 | 4/1964 | Jacobs | 361/355 |
| 3,278,807 | 2/1963 | Galante et al. | |
| 3,769,553 | 10/1973 | Coley | 361/353 |
| 4,118,754 | 10/1978 | Duggan | 361/355 |
| 4,167,769 | 9/1979 | Luke et al. | 361/355 |
| 4,251,851 | 2/1981 | Diersing et al. | 361/363 |

Primary Examiner—G. P. Tolin
Attorney, Agent, or Firm—Richard A. Menelly; Walter C. Bernkopf; Fred Jacob

[57] ABSTRACT

Circuit breaker support saddles for electrical load centers and panel boards are fabricated from a single thermoplastic molded structure. The saddle contains integrally formed posts for supporting the power bus and neutral terminal conductors along with a plurality of circuit breaker hooks. To accommodate for varying numbers of circuit breakers when mounted to the saddle, a plurality of thermoplastic modular phase barriers are provided for supporting the circuit breaker branch strap conductors. The phase barriers include integrally-formed pedestals, posts and stops to facilitate downloaded robotic assembly of the branch straps to the saddle during the automated manufacturing process.

6 Claims, 5 Drawing Figures

CIRCUIT BREAKER SUPPORT SADDLE WITH REMOVABLE PHASE BARRIERS

BACKGROUND OF THE INVENTION

U.S. patent application Ser. No. 802,347, filed Nov. 27, 1985, entitled "Molded Case Circuit Breaker Modular Support", filed concurrently with the instant application, describes a modular plastic saddle that is robotically assembled. The modular sections of the saddle allow for the manufacture of load centers and panel boards having any number of circuit breakers attached. The saddles serve to support the main busses and branch straps as well as the neutral terminal conductors for connection with the circuit breakers. To electrically insulate between the branch straps and main busbars, a plurality of electrically insulating phase barriers are arranged on the surface of the saddle, and in some molded plastic saddle designs, are integrally formed therein. With the introduction of the aforementioned modular plastic saddle wherein any number of circuit breakers are robotically assembled to the saddle with a minimum number of inventoried parts, it is more economically feasible to provide modularity with respect to the phase barriers utilized with the precise number of circuit breakers. This is accomplished by the phase barriers of the instant invention which are fabricated from a single thermoplastic part that is interchangeable over a wide range of load center and panel board designs and which can be arranged in accordance with the exact number of circuit breakers on each saddle.

SUMMARY OF THE INVENTION

Interchangeable modular electrically insulating phase barriers are formed from a single thermoplastic part having means thereon for facilitating attachment to plastic circuit breaker support saddles and having means integrally formed thereon for positioning and supporting the circuit breaker branch straps in a fully automated assembly process.

DESCRIPTION OF THE PREFERRED EMBODIMENT

Figure 1:
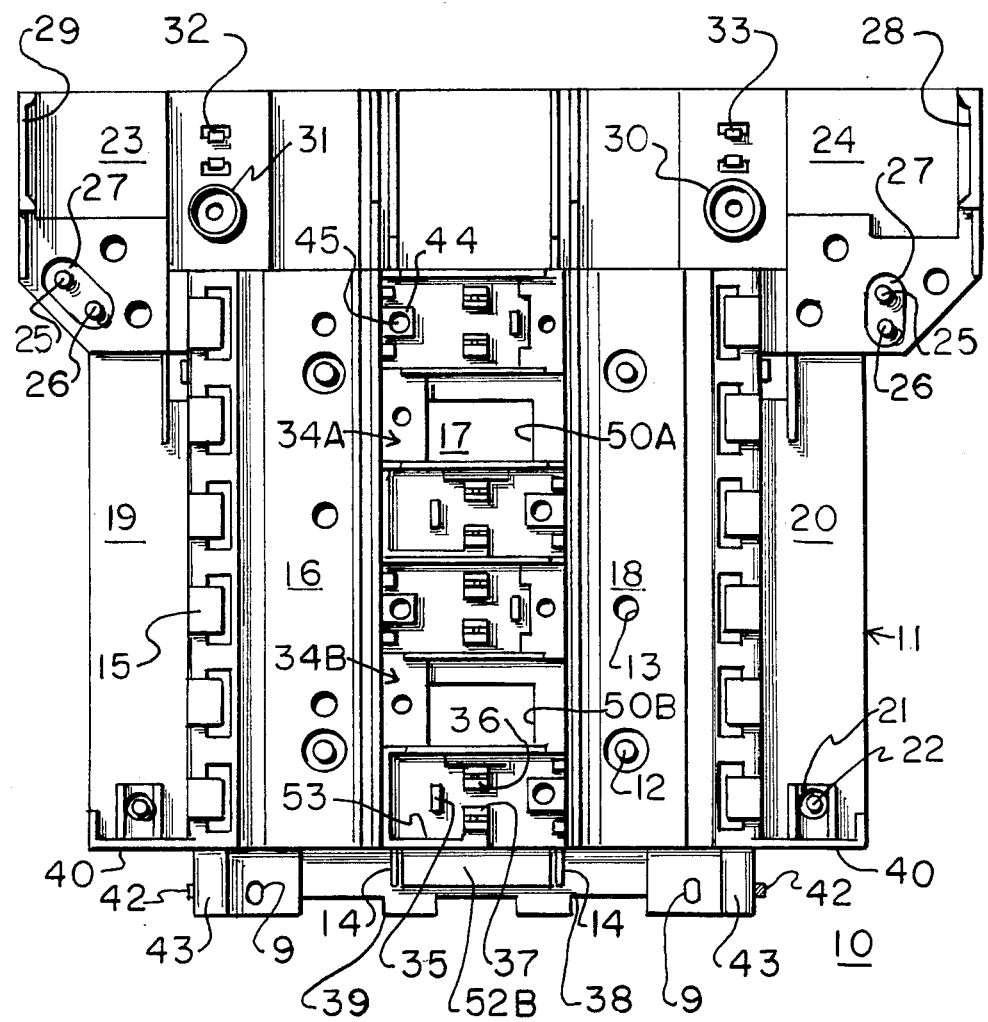
FIG. 1 is a plan view of a thermoplastic circuit breaker support saddle containing 2 phase-barrier modules according to the.invention.
Figure 2:
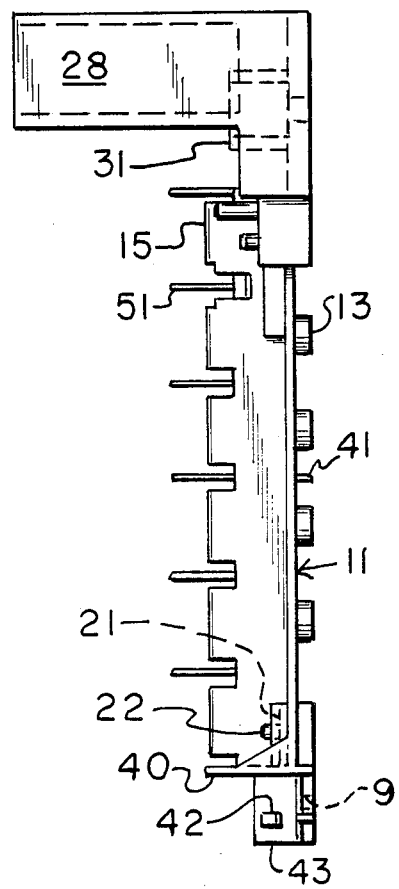
FIG. 2 is a side view of the circuit breaker support saddle depicted in FIG. 1.
Figure 5:
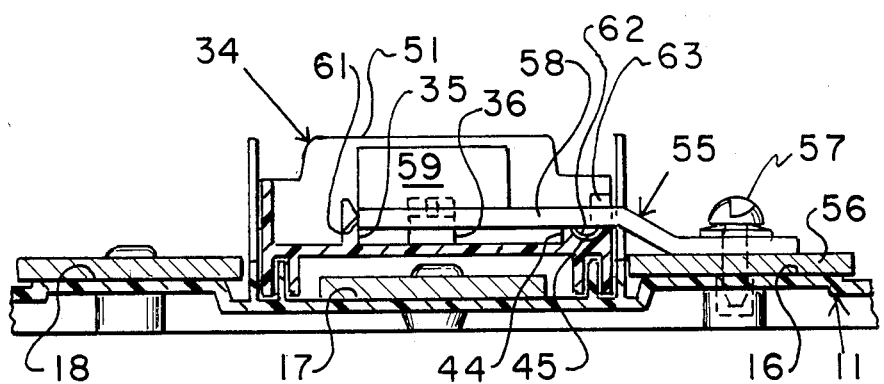
FIG. 5 is a broken side view of the phase barrier module of the invention within a plastic circuit breaker saddle with a branch strap conductor supported thereon.
Figure 3:
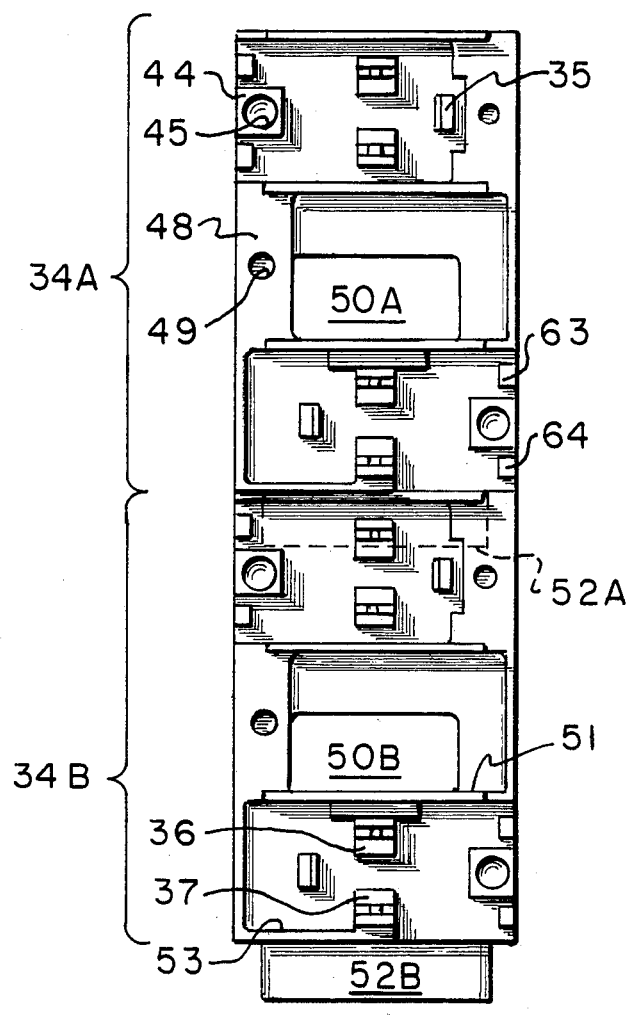
FIG. 3 is a plan view of the 2 phase-barrier modules depicted within FIG. 1.
Figure 4:
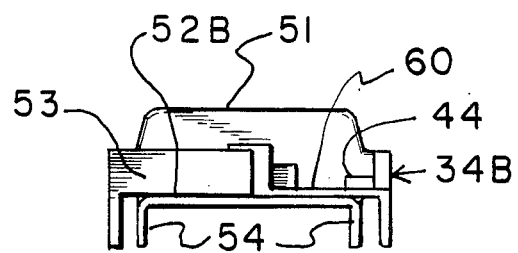
FIG. 4 is an end view of one of the phase barrier modules depicted in FIG. 3.

A plastic saddle 10 such as described in the aforementioned U.S. patent application is shown in FIG. 1 to consist of a thermoplastic support 11 having a plurality of posts 12, circular recesses 13, longitudinally extending parallel tracks 14 and circuit breaker hooks 15 integrally formed therein by means of a single injection molding process. Three inner planar surfaces 16–18 are defined therein for supporting the main power busses to which the circuit breaker branch straps are connected along with a pair of outer planar surfaces 19, 20 to which the neutral terminal connectors are attached. A pair of posts 22 on pedestals 21 are formed at one end of the outer planar regions to position and support the neutral bus terminals when robotically loaded thereon. A pair of platforms 23, 24 are formed at the opposite end of the outer planar regions and a pair of posts 25, 26 of different heights are integrally formed on the platform surfaces for facilitating the attachment of a neutral terminal conductor. Oval recesses 27 are provided at the base of posts 25, 26 to facilitate the automated assembly of the neutral terminal conductor. Barrier extensions 28, 29 on opposite ends of the platforms provide electrical isolation between the neutral conductors and the other interior components of the load center or panelboard enclosure. A pair of tubular extensions 30, 31 provide clearance through the bottom of the support for enabling attachment of the support to a mounting pan within the load center or panelboard or the enclosure itself, and electrically isolate the mounting screws therein from the electrical components mounted elsewhere on the support. A pair of split posts 32, 33 proximate the tubular extensions allow for the mounting of a separate optional main circuit breaker module. A pair of modular circuit breaker branch strap supports and phase barriers 34A, 34B hereafter "phase barriers", are removably mounted on tracks 14 for positioning and supporting the circuit breaker branch straps when robotically assembled on the support 11. Each phase barrier contains a pair of support posts 36, 37, stop 35 and a recess 45 formed within a pedestal 44 all integrally formed on the top surface of the phase barriers. The stop 35 on a side of the support posts 36, 37 opposite from the recess 45 and pedestal 44 allows an end 61 of a circuit breaker branch strap 55 to precisely locate on the phase barrier surface and allows the bottom surface of the branch strap subjacent the attached circuit breaker stab 59 to come to rest on the supports 36, 37 as best seen in FIG. 5. The bottom of the branch strap away from the circuit breaker stab is positioned within the recess 45 in pedestal 44 before attaching the branch strap to the main bus 56 which is mounted on the inner planar surfaces 16, 18. Openings 50A, 50B are formed on the top surface of both of the phase barriers to allow for the projection of the circuit breaker stabs as well as anti-turn function to the stabs that are carried by the main busses as shown in FIG. 1. Projections 42 are formed on opposite sides of the inverted U-shaped rails 43 which extend from the end of the support proximate the raised end barriers 40 which are located at the end of the outer planar surfaces 19, 20 to insulate the neutral terminal conductors from the remaining interior of the load center or panelboard enclosure. The inverted U-shaped rails provide for the interconnection of molded plastic modules as described in the aforementioned U.S. patent application for extending the length of the plastic saddle 10 to accommodate an increased number of circuit breakers. As also described in the referenced patent application, a step 38 is formed intermediate the inverted U-shaped rails for supporting an edge of the module. The step extensions 39 provide added support between the attached module and the main plastic saddle. The mounting slots 9 provide for attachment of the support 11 to the load center or panelboard support pan or enclosure in a similar manner as described earlier with respect to tubular extensions 30, 31. The phase barriers 34A and 34B each comprise separately molded modular units and are shown in FIGS. 3 and 4 apart from the support 11 in FIG. 1 wherein the step 52A indicated in dashed lines on phase barrier 34A lies subjacent the end of phase barrier 34B opposite its step 52B. To facilitate the connection between both phase barriers, 34A, 34B a plastic adhesive coating is applied to the subjacent step 52A although such a coating is not generally required. The end of the phase barrier 34B is shown in FIG. 4 to include inverted rails 54 on both sides to provide electrical insulation between the main bus conductors and to additionally support the platform 52B and an end barrier 53. The insulating barrier 51 extending above the end barrier, integrally formed and extending from the top surface 60, provides electrical insulation for the branch straps when loaded thereon. The plastic saddle 10 shown in FIG. 1 is depicted in FIG. 2 to show the relative heights of the barrier extension 28 with respect to the circuit breaker hooks 15 and the insulating barriers 51 within the support 11. The circular recesses 13 are seen to extend down from the bottom of the support to maintain electrical insulation between the screws used to attach the branch straps to the main bus conductors and to space the support from the load center or panelboard bottom pan or enclosure (not shown). The raised end barrier 40 electrically isolates the neutral terminal conductors when arranged on post 22 and pedestal 21 as described earlier. The insulated U-shaped rail 43 is depicted extending from the end of the support and containing a projection 42 for mating with a separate module. Slots 9 and tubular extensions 30, 31 allow for the connection between the support and the aforementioned load center or panelboard bottom pan or enclosure.

The attachment between the branch strap 55 and power bus 56 by means of screw 57 and the arrangement of the branch strap on phase barrier 34 attached to support 11 is best seen by referring back to FIG. 5. The body 58 of the branch strap 55 is supported by means of support post 36 and the front 61 of the line strap abuts against stop 35 between a pair of insulating barriers 51 as shown. The provision of the stop 35 and the arrangement of the guide support post 36 is an important feature of the invention and allows the robotic assembly of the branch strap within phase barrier 34 during the automated manufacturing process. To provide further support to the branch strap and to provide unidirectional motion by preventing the branch strap from moving in a direction away from the stop 35 during the automated assembly process, a dimple 62 pressed into the body 58 of the branch strap nests within the recess 45 formed within the support pedestal 44. To prevent the branch strap from rotating when screw 57 is applied to fasten the branch strap to the main bus, a pair of guide posts 63, 64 are formed on either side of the pedestal. The posts are angled to further facilitate the assembly of the branch strap to the phase barrier. This arrangement also lends stability to the circuit breaker stab 59 which is fastened to the body of the branch strap.

It is thus shown that the number of branch straps and circuit breakers can be varied during the manufacturing and assembly process of a circuit breaker support saddle by means of a modular phase barrier removably arranged on the surface of the support saddle and adapted for multiple assembly. The modular phase barrier contains integrally formed supports, insulation barriers, anti-turn recesses and stops to facilitate robotic assembly during a high speed automated manufacturing process.

Having described our invention, what I claim as new and desire to secure by Letters Patent is:

1. A modular phase barrier assembly including a molded plastic circuit breaker support saddle comprising:
   a molded plastic circuit breaker support saddle having insulative phase barrier members thereon supporting main bus conductors and branch strap conductors;
   each phase barrier member comprising a molded plastic support defining a top surface, a bottom surface and a pair of opposing ends, said plastic support having access means through both of said surfaces for passage of a molded case circuit breaker connector stab;
   a plurality of planar walls integrally formed within said plastic support and extending upwards from said top surface to provide electrical insulation between a plurality of branch strap conductors when mounted on said top surface;
   a plurality of post means integrally formed within said plastic support for guiding and supporting said branch strap conductors on said top surface;
   rail means integrally formed within said plastic support and extending from said bottom surface and attaching said plastic support to corresponding support track means extending from a top surface of said plastic circuit breaker support saddle, said rail means and said track means further provide electrical insulation between said main bus conductors and said branch strap conductors; and
   a step integrally formed at one of said support ends for receiving an end integrally formed in a separate plastic support whereby a plurality of said plastic supports and said separate plastic supports can be abuttingly assembled together on said plastic circuit breaker support saddle.

2. The modular phase barrier assembly including a molded plastic circuit breaker support saddle of claim 1 wherein said rail means comprises an inverted U-shaped rail, said rail further comprising a pair of legs spaced and in press-fit attachment to said support track on said plastic circuit breaker saddle.

3. The modular phase barrier assembly including a molded plastic circuit breaker support saddle of claim 1 further including pedestal means integrally formed on said plastic support and having recesses formed therein, said recesses receiving a dimple formed on each of said branch strap conductors.

4. The modular phase barrier assembly including a molded plastic circuit breaker support saddle of claim 3 wherein one of said post means is positioned on said top surface opposite said pedestal means for contacting a front end of one of said branch straps.

5. The modular phase barrier assembly including a molded plastic circuit breaker support saddle of claim 1 wherein said access means comprises a rectangular opening intermediate both ends of said support.

6. The modular phase barrier assembly including a molded plastic circuit breaker support saddle of claim 1 wherein said rail means is integrally formed within said plastic support subjacent said step.

* * * * *